United States Patent [19]

Stewart

[11] Patent Number: 5,403,142
[45] Date of Patent: *Apr. 4, 1995

[54] PALLET HANDLING ADJUSTABLE CONVEYOR

[75] Inventor: William T. Stewart, Zanesville, Ohio

[73] Assignee: Stewart-Glapat Corporation, Zanesville, Ohio

[*] Notice: The portion of the term of this patent subsequent to Feb. 21, 2012 has been disclaimed.

[21] Appl. No.: 269,834

[22] Filed: Jul. 1, 1994

Related U.S. Application Data

[63] Continuation-in-part of Ser. No. 74,734, Jun. 10, 1993, which is a continuation-in-part of Ser. No. 748,817, Aug. 22, 1991, abandoned.

[51] Int. Cl.⁶ .......................... B65G 67/20; B65G 1/06
[52] U.S. Cl. ...................................... 414/392; 414/399; 414/398; 414/666
[58] Field of Search ................ 414/390, 391, 392, 398, 414/399, 573, 588, 665, 663, 666, 667, 668, 669, 670, 671, 672

[56] References Cited

U.S. PATENT DOCUMENTS

| | | | |
|---|---|---|---|
| 2,755,945 | 7/1956 | Gilson | 214/132 |
| 2,823,813 | 2/1958 | Shimmon | 214/75 |
| 3,202,242 | 8/1965 | Dolphin | 414/666 X |
| 3,216,552 | 11/1965 | Lister, Jr. | 198/139 |
| 3,291,261 | 12/1966 | Robb | 187/9 |
| 3,596,785 | 8/1971 | Weatherford, Jr. | 214/89 |
| 3,788,452 | 1/1974 | McWilliams | 198/139 |
| 3,811,579 | 5/1974 | Black | 214/38 D |
| 3,819,068 | 6/1974 | Weir | 214/38 C |
| 3,835,980 | 9/1974 | Brooks, Jr. | 198/139 |
| 3,866,768 | 2/1975 | Weir | 214/38 B |
| 3,984,019 | 10/1976 | Brudi et al. | 414/666 X |
| 3,993,204 | 11/1976 | Hummel | 214/89 |
| 4,128,183 | 12/1978 | Finlayson | 414/666 |
| 4,289,442 | 9/1981 | Stevens | 414/629 |
| 4,595,331 | 6/1986 | Thompson et al. | 414/347 |
| 4,643,299 | 2/1987 | Calvdan | 198/812 |
| 4,728,241 | 3/1988 | Edelhoff et al. | 414/392 |
| 5,009,560 | 4/1991 | Ruder et al. | 414/398 X |
| 5,015,145 | 5/1991 | Angell et al. | 414/398 X |
| 5,036,952 | 8/1991 | Harper | 414/667 X |
| 5,052,882 | 10/1991 | Blau et al. | 414/667 |

*Primary Examiner*—Michael S. Huppert
*Assistant Examiner*—James Eller
*Attorney, Agent, or Firm*—Robert & Associates; Jon L. Roberts

[57] ABSTRACT

A material handling adjustable conveyor comprising an adjustable boom, and front-end material handling device with four degrees of freedom to allow loads to be lifted and rotated into position and placed or removed from an over-the-road vehicle or unloaded from such a vehicle. During the loading or unloading procedure, the load is only supported by the front-end material handling device. Some of the load is borne by the floor of the cargo vehicle when more than minimal torsion forces are applied to the front-end material handling device. The material handling device is computer controlled based upon the dimensions of the vehicle being loaded and unloaded and further comprises sensors for fine adjustment of front-end handling device motion during the course of the loading or unloading. Other senors can be used to measure and record the internal dimensions of a cargo vehicle. The dimensions can be stored in an on-board computer, which will subsequently automatically control the loading and/or unloading movements of the front-end material handling device.

4 Claims, 12 Drawing Sheets

PALLET HANDLING ADJUSTABLE CONVEYOR

BACKGROUND OF THE INVENTION

This application is a continuation-in-part of application Ser. No. 08/074,734, filed Jun. 10, 1993, now allowed, which is a continuation-in-part of application Ser. No. 07/748,817, filed Aug. 22, 1991, now abandoned.

RELATIONSHIP TO OTHER APPLICATIONS

This application discloses the same invention that was the subject of a Great Britain application Ser. No. 9018593.5 filed Aug. 24, 1990; PCT Application No. PCT/US92/01416 filed Feb. 25, 1992; and Canadian application No. 2,061,379-3 filed Feb. 18, 1992.

1. Field of Invention

The present invention relates to devices for loading and unloading pallets or other concentrated loads into or from over-the-road cargo vehicles and more particularly for a conveyor device with an integrated pallet handling apparatus. Other specific apparatus are used for non-palletized concentrated loads, such as slipsheet loads, paper rolls, drums, and containers.

2. Background of the Invention

In a typical loading and unloading operation for an over-the-road cargo vehicle (e.g., a tractor-trailer), material is brought to a loading dock and subsequently transferred to a device that in turn transports the cargo into the vehicle to be loaded. Conveyor belts or roller conveyors are typically used to move cargo to a loading dock and forklift trucks or other similar cargo handling vehicles are used to subsequently transport the cargo into the vehicle to be loaded. Such cargo handling vehicles are often electrically driven or propane fueled. The forklift truck together with the operator lifts the load and moves it from the floor of the loading dock or cargo storage area into the vehicle. This operation requires the presence of some form of ramp or dock leveler between the facility floor and the vehicle.

Once inside the cargo vehicle the load must be properly positioned and placed on the floor. This maneuvering by the forklift creates wear and tear on the floor of the cargo vehicle and can damage not only the vehicle but the pallet or load that is being loaded. This sequence is reversed for unloading of the vehicle with the similar potential existing for damage to the floor of the vehicle and the cargo being handled.

The use of forklift trucks has long been the preferred approach to heavy material movement. This approach however requires that a warehouse operation devote areas for parking and maintenance of such vehicles. Further, propane or gasoline fueled forklifts cause pollution. Electrically powered forklifts also require maintenance and charging areas. All of these requirements add large expense to a warehouse/loading dock operation.

Various approaches have been taken to (a) eliminate the need for a separate forklift truck to enter the cargo vehicle and/or (b) eliminate the potential wear and tear on the floor of the over-the-road vehicle created by the presence of a forklift truck or other similar cargo handling vehicle. U.S. Pat. No. 2,755,945 to Gilson describes an apparatus for loading and unloading of a vehicle that comprises a fully cantilevered structure together with a forklift mounted on the end of the structure. While this device can extend into a truck to be loaded, the entire structure moves in and out of the vehicle, therefore requiring a great deal of facility room in order to operate. Further, the Gilson apparatus requires that an operator physically sit in the cantilevered structure to run the forklift at the end of that structure. In order to traverse from one side of the vehicle to the other, the entire Gilson apparatus must be transported laterally in order to load pallets or cargo on either side of the vehicle to be loaded. Further, the Gilson apparatus does not have an adjustable length capability thereby limiting its usefulness to facilities having a great deal of loading dock space.

U.S. Pat. No. 2,823,813 to Shimmon describes a self-loading forklift truck. The forklift on this vehicle rotates about an axis for loading objects onto the bed of the truck. The Shimmon invention however requires that the truck physically enter the vehicle being loaded or unloaded. It therefore does not mitigate wear and tear on the floor of the vehicle being loaded or unloaded and it takes up valuable cargo room in the vehicle itself.

U.S. Pat. No. 3,788,452 to McWilliams describes an extendable conveyor belt that is partially cantilevered. However, the McWilliams apparatus requires the entire conveyor belt to be wheeled into the bed of the truck to be loaded or unloaded, thereby again placing a heavy floor load on the bed of the vehicle in question. Further, there is no lateral adjustment of the McWilliams apparatus allowing cargo to be removed from different sides of the cargo vehicle.

U.S. Pat. No. 3,596,785 to Weatherford describes an adjustable conveyor belt requiring a series of supports along the length of the conveyor belt as it extends into a vehicle being loaded or unloaded. Again, floor loading problems can result from this type of support system. Further, once inside the vehicle to be loaded, no provision is made for lateral movement with the cargo vehicle for loading pallets on either side of the vehicle.

U.S. Pat. No. 3,819,068 to Weir describes a boom conveyor that is adjustable for extension into a truck to be loaded or unloaded. Again, however, the Weir apparatus requires support once extended into the truck during the course of loading of pallets. Again, this invention does not account for wear and tear on the floor of the vehicle to be loaded or unloaded.

U.S. Pat. No. 3,835,980 to Brooks describes an adjustable conveyor belt with extendable booms. The Brooks apparatus however does not address the issue of material/cargo handling at the end of the boom.

U.S. Pat. No. 5,009,560 to Ruder et al. discloses a freight handling system having a conveyor apparatus that extends into a cargo vehicle. The portion of the conveyor that extends into the cargo vehicle is supported by a rolling assembly that rests entirely on the floor of the cargo vehicle interior, causing wear and tear and possible damage to the floor. The Ruder system requires constant operator interaction during loading and unloading procedures.

U.S. Pat. No. 3,984,019 to Brudi et al. discloses a lift truck side loading attachment having pallet engaging forks facing the side of the lift truck. The load carried by the attachment is displaced partially below the boom supporting the attachment without interfering with movement of the boom. The Brudi device is useful for the sole purpose of carrying long or wide loads through a narrow space by turning the load sideways.

U.S. Pat. No. 5,052,882 to Blau et al. discloses a material handling device having forks that are independently adjustable to suit the load being carried. The fork spacing can be automatically adjusted with respect to the load through the use of fork sensors and automatic drive means. Once the forks are adjusted and the load is positioned on the forks, human interaction is necessary to load or unload a cargo vehicle using the material handling device as no automated loading or unloading means are disclosed.

Other cargo handling devices have been the subject of U.S. Patents. For example, U.S. Pat. No. 4,728,241 to Edelhoff et al. (garbage truck container transfer device), U.S. Pat. No. 3,291,261 to Robb (truck elevator for lifting pallets from a loading dock onto a truck), U.S. Pat. No. 4,249,842 to Johnson (self loading multiple bale trailer) all deal with cargo loading in some form. These inventions deal with parts of the problems associated with loading and unloading vehicles but do not together address the issue of subsequent internal cargo handling by forklifts or related vehicles, the transverse loading of pallets within a vehicle, or the elimination of human interface inside the cargo vehicle being loaded or unloaded.

None of the references described above discloses a load handling device that extends into the interior of a cargo vehicle without supporting the load directly on the floor of the cargo vehicle interior. Further, none of the references discloses a load handling device that uses a system of sensors and logic means to measure the interior dimensions of a cargo vehicle in order to automatically load or unload the cargo vehicle accordingly.

SUMMARY OF THE INVENTION

It is therefore an objective of the present invention to eliminate facility storage space for forklift trucks and other material handling vehicles.

It is a further objective of the present invention to allow for the smooth flow of cargo from an over-the-road vehicle into other automated systems in a loading dock environment.

Also an objective of the current invention is to allow for an adaptable means of handling diverse loads that are shipped in over-the-road vehicles.

It is further an objective of the current invention to eliminate labor costs associated with loading dock vehicle drivers, and vehicle maintenance personnel.

It is a further objective of the current invention to achieve reduced load and unload cycle times compared with current manual and semi manual methods of loading and unloading over-the-road vehicles.

It is another objective of the present invention to provide for the automated loading and unloading of over-the-road cargo vehicles with minimal operator interaction with the loading device.

It is an additional objective of the current invention to eliminate any product damage occasioned by the use of separate forklift vehicles which must drive in and out of over-the-road vehicles which ship goods.

The Pallet Handling Conveyor System ("PHCS") is an electromechanical cargo handling system which loads or unloads cargo vehicles present at a loading dock in a manufacturing, warehouse, and/or distribution facility. The PHCS comprises four distinct subsystems:

1. A roller conveyor and undercarriage,
2. A set of extendable boom structures,
3. A Pallet Handling Device mounted on the front end of the boom structures, and
4. A Control System to initiate, monitor, and direct all movements of the PHCS.

The Roller Conveyor and Undercarriage Subsystem is positioned on a dock and lines up with the centerline of the trailer to be loaded or unloaded. It may be lagged to the floor at a stationary dock position, or may include a mobile undercarriage with wheels to move it along the dock to several dock door locations. The structural frame supports a roller conveyor for pallet accumulation, and provides the structural support for the extending booms.

The set of extending booms provides the cantilevered extension of the PHCS into the trailer. These booms move in synchronized motion and each boom telescopes within the confines of the outer boom. Each boom provides structural support for the mating boom using camrols. The number of booms and lengths of the booms will vary, depending on dock space and trailer length.

The Pallet Handling Device ("PHD") is a mechanism mounted on the end of the extending booms and provides the means to pick up, rotate, carry, and position the pallets into or from the trailer. The PHD provides vertical movement, lateral movement, rotation, and close tolerance positioning of the pallet loads.

The Control System provides system control of all motions of the PHCS and includes a Programmable Controller, software, limit switches, gearmotors, starters, frequency drives, sensors of various types, and position encoders.

The fixed section of the extendable conveyor portion of the PHCS can be mounted on a mobile undercarriage to move from door to door of different cargo vehicles. The unit is stationary during a given loading/unloading operation and is designed to interface with a variety of materials handling systems such as roller conveyors, belt conveyors, forklifts, and Automated Guided Vehicle Systems (AGVS). An alternative to the roller/conveyor section of the present invention is an arrangement whereby pallets or other cargo to be loaded are presented on rollers in front of the PHD perpendicular to the direction in which they will travel when they are loaded into the over-the-road vehicle. This situation occurs with very dense or wide loads which must travel on the floor of a loading dock as opposed to over a roller or conveyor belt transport. In the non-conveyor situation a series of booms is used to extend the PHD into the truck. However, rotational movement of the PHD about an axis is eliminated in this case.

In the loading operation, the pallet load moves along the conveyor on the conveyor rollers moving from the rear of the fixed conveyor section of the PHCS to the front end PHD attached to the fixed conveyor by way of boom structures which extend the PHD into the vehicle. Upon reaching the end of the fixed conveyor, the pallet load is next handled by the PHD.

The PHD can take the form of various load supporting and movement controlling subsystems. Possible front-end handling devices contemplated for use with the present invention and well known to those skilled in the art included forklift means, cylindrical handling means, barrel grippers, vertical side grippers, and slip sheet gripping and pushing devices. In general, however, the PHD operates in the same fashion regardless of the various optional front-end material handling devices that may be attached to it. For example, the PHD operates with four degrees of freedom, each of which is independent from the other. The forks or other material handling device are attached to a mast which allows the load to be moved vertically. The mast system itself is on a rotating bearing which can rotate in a complete horizontal circle (360 degrees). Further, the mast moves across the width of the over-the-road vehicle being loaded or unloaded by means of transverse rails. Finally the handling device itself can pivot on a horizontal transverse axis to align with the floor to aid in the insertion and removal of forks into and out of a pallet or to otherwise orient the handling device to the material being loaded or unloaded. It should also be noted that the PHD comprises floor support rollers to eliminate torsion as the load is moved from side to side on the transverse rails. Some slight portion of the pallet load is borne by the floor rollers at times when the torsional forces are applied. During normal operation, however, when the load is well balanced and torsion forces are minimal, the floor rollers support none of the pallet load.

Connected to the front end of the foremost boom structure is a vertical support structure that provides vertical movement of the entire PHD mechanism. A horizontal support structure is directly coupled to this vertical structure. A second vertical structure is movably connected to the horizontal support structure and is capable of traversing horizontally across the width of the horizontal support structure inside the cargo vehicle being loaded or unloaded by virtue of an electronically actuated side to side ball screw mechanism.

Both vertical mast structures comprise electronically actuated vertical ball screw mechanisms. The vertical movement provided by the vertical ball screw mechanism allows the attached PHD (e.g. forks or other) to be raised from the floor of the vehicle to any height within the vehicle. The foremost (that is, front) vertical mast structure is positioned on a 360° rotational bearing allowing the entire vertical structure, forks, and load to be electronically rotated 180 degrees in either direction to face the rear of the vehicle being loaded once the load is raised vertically to a height clearing the roller conveyor positioned on the undercarriage. This rotation is controlled by a gearmotor, pinion, and circular rack mounted on (may be inside or out) the rotational bearing.

The movement of the entire device (cantilevered booms and PHD) is controlled by computer. The program which controls the function of the PHCS is written in "ladder" logic for use by the Programmable Logic Controller (PLC). Various inputs are constantly scanned by the PLC and when the inputs are matched with programmed combinations, outputs are enacted by the PLC. Inputs may be simple On-Off types, or can give values, such as analog voltage or number of counts. Values of these inputs are specified and Outputs are put into action.

Inputs are organized into three main categories: Operator control/interface for Fixed Section, Operator Control/Interface for PHD, and Sensor/Operation Feedback (Auto/Manual). Outputs are in two categories: General Control Interface, and Motor Control Interface.

The Sequence of Operations is given for the Loading Sequence. The control logic of the computer system allows the vehicle size and dimensions to be loaded into the computer either by the operator or via an automatic initialization scan of the vehicle. Thereafter, movements of the cantilevered booms and the PHD are controlled by the control logic of the computer.

The PHCS includes an extendible conveyor with a front-end PHD attached. The extendible conveyor is preferably a triple boom model, with a closed length of 35 feet, providing 55 feet of cantilevered extension. The fixed section of the conveyor has roller conveyor sections mounted on it for accumulation of the pallet loads from the delivery system. The three booms extend and retract in synchronized motion from the fixed section. The entire conveyor system can be mounted on wheels for traversing to alternate cargo vehicle door locations.

The PHD section is mounted on the front of the boom sections and moves with it into and out of the trailer. Stabilizing rollers are provided to make floor contact when required to eliminate any torsion when the pallet load moves from side to side in the trailer. As previously stated some of the pallet load is borne by the trailer floor at such times of torsional forces; however, such load is much less than otherwise would be encountered using a fork lift truck. None of the pallet load is supported by the trailer floor when the load is centered during boom extension or retraction.

The fork mechanism is mounted on a mast, with UP-DOWN motion controlled by a vertical motorized ball screw. The entire mast moves side-to-side, controlled by a horizontal motorized ball screw. The Mast Structure is supported by two horizontal rails, as it moves from side-to-side. This entire Rail/Mast mechanism is supported by the aft vertical mast structure, with up-down motion controlled by a vertical motorized ball screw. The aft vertical mast structure is attached to the front boom structure. Tilting of the forks is accomplished using a cam system mounted near the base of the mast.

The Mast Structure is mounted on a rotating bearing which is driven by a rack/pinion arrangement so the entire mast can rotate in a horizontal circle. This allows the forks to engage a pallet which is located at the front of the roller conveyor sections and to rotate 180 degrees to enter the trailer.

The degrees of freedom of motion are summarized below:

EXTEND-RETRACT: This motion causes the boom structures and the attached PHD to move along the centerline of the trailer from the dock to the front of the trailer.

PHD UP-DOWN: This motion causes the entire PHD system to move vertically for proper vertical alignment and clearance with the trailer floor.

PHD LEFT-RIGHT: This motion causes the Mast Structure to move across the width of the trailer for proper placement of the pallet on the trailer floor.

MAST-UP-DOWN: This motion causes the forks to move vertically between the height of the pallet pick-up section of the roller conveyor and the floor level of the trailer.

MAST ROTATE: This motion causes the Mast Structure to rotate in a circle to properly orient the pallet from the roller conveyor section to the trailer.

PHD FORK TILT: This motion causes the pallet engagement device (or forks) to tilt to match the floor slope for proper disengagement of the forks from the pallet.

MODES OF OPERATION: This system can be operated in either the LOAD or the UNLOAD modes. The necessary motions for either mode are provided in the basic mechanical package, and only the electrical controls would be customized for either or both of these modes.

ELECTRICAL CONTROLS: The control circuitry is modular in design with a complete complement of required logic in the basic program.

The basic control circuit is centered on the use of a PLC, mounted on the fixed section of the PHCS. This PLC provides both the input capability and sufficient outputs to control all functions. PLC input cards include discrete input, analog input, and high-speed counters; output cards include discrete relay output and computer/modem interface. A display message system is provided with keypad interface for operator control and trouble-shooting.

Five position encoders are used for precise control of all movements. Boom Extension location will be monitored using a linear position encoder or other position measuring device (for example, a laser) connected between the fixed section and PHD. Thus the precise location of the PHD is determined by direct measurement, eliminating any adverse effect of variability in the boom drive system. The location of the PHD will be controlled to an accuracy of plus or minus 0.25 inches. Other encoders are used for the PHD rotation, the UP-DOWN of the forks, the Side-to-Side movement of the Mast, and the up-down of the PHD.

The speed of the various motions will be controlled with frequency drives. Three separate drives will be used and they will be switched to the various motions as required.

Thus smooth acceleration-deceleration motions will be assured.

An Emergency Run Bypass System will be used to allow a supervisor to control all motions if the system must be operated outside of full PLC control.

Anti-collision zone isolation, and position sensing are employed to ensure that the moving PHD will not hit an unanticipated obstacle. Sonic sensor(s) with analog output will be used to measure the distance of the PHD from the sides of the trailers and looking forward to the cargo already in the vehicle. Each motion will also have "end of motion" sensing devices (positive drive limit switches) to prevent action beyond the normal design limits, and a "home" sensing device (proximity switch) to provide a zero encoder count signal to the PLC.

To prevent PHD movement during the presence of any personnel in the active trailer area, photo-reflective sensors will be used to detect any entry by persons while the system is activated. Thus once a visual check of the trailer has been made by the supervisor and he/she has confirmed an empty operating environment by pushing a button, the system will shut down if any sensor beam is broken in the trailer entry area.

SYSTEM INTERFACES: The PHD system controls will easily interface with other control systems in the operating environment. Status of the system can be communicated to a host control system, and activation of the PHD system can be controlled by a central computer. Self-diagnostics with coded displays are provided to assist Supervisors and Maintenance Personnel in trouble-shooting any operational problems which arise; additionally, a PLC to phone line interface is included to provide assistance by the manufacturer when necessary.

The actual motions of the vertical structure and horizontal support structure are controlled by independent electrical power control systems. These power sources can also be hydraulic.

The sequence of operations for loading is presented below:

SEQUENCE OF OPERATIONS LOADING
1. Machine in "PARK" position, "OFF" mode selected.
2. Wait for operator to select "AUTOMATIC" code.
3. Query operator concerning machine status.
4. If Machine status is satisfactory, the logic gives a signal allowing the PHCS to operate.
5. Operator selects "START" auto-load sequence.
6. The "AUTO-RUNNING" warning light is next actuated, and 5-sec. warning horn is sounded.
7. The PHCS will perform an initialization sequence. The PHCS will extend into the vehicle and gather dimensional readings from the sonic sensors on the position of the two sides of the trailer and the forward wall of the vehicle. Floor contact will be periodically made to determine the relative slope of the trailer floor. These data will be stored in the PLC and will be used to determine the required pallet locations in this two dimensional matrix. Trailer misalignment and sloping floors will be determined from this initialization sequence.
8. The PHCS next gives the "Ready to Receive Cargo" signal.
9. Cargo is moved to the "Pallet Engaged State-1" switch and stopped.
10. The pallet is then lifted to the upper limit of the mast.
11. Sensors then confirm the load is on forks.
12. The pallet is then rotated to front position.
13. The entire PHD is then lowered to "travel entry" position and the forks are lowered to "travel" position.
14. After confirming that the forks are in the travel position, the booms are extended into the trailer. The boom extension speed is set to 100%.
15. After the PHD enters trailer, the PHD lift control is switched to automatic.
16. After the booms have extended to the discharge location and the PHD support wheels contact the trailer floor, the pallet is positioned left or right as necessary for placement.
17. Left/Right pallet positioning is accomplished at final boom position, less one foot if pallet is first to be placed in present row. Left/right pallet positioning is accomplished at the final boom position less six feet, if pallet is last to be placed in present row.
18. At final boom position, less eight feet, ramp to 15% boom speed.
19. Lower pallet to delivery position.
20. Continue boom extension at 15% speed until final extension position is reached —OR— second bumper switch is actuated.
21. Lower pallet to disengagement position.
22. Confirm "no load on forks sensed", retract booms at 15% speed.
23. At last extend position minus three feet, return forks to center position, ramp boom speed to 100%.
24. Raise forks to upper limit position.
25. Rotate forks to back position. (boom retraction continues) (see seq. note 1).
26. Lower forks to engage position. (boom retraction continues) (see seq. note 2).
27. When boom extension is at trailer door plus two feet, raise PHD lift to trailer entry position. When outside trailer door raise PHD lift to full position.
28. Slow boom retraction to 15% at full retract position plus six feet. Confirm boom velocity at plus one foot, if greater than 25%, perform hardstop shutdown.

29. Repeat sequence until loading cycle is complete.

SEQUENCE OF OPERATION NOTES

1. These sequence steps must be completed prior to the final four feet of boom retraction.
2. All changes in motor speeds to be ramped except for designated hard stops and emergency stops.

It can be seen that by using a series of reverse steps, a trailer can be unloaded using the PHCS.

DETAILED DESCRIPTION OF THE INVENTION

The PHCS comprises three major parts: roller conveyor or belt system, an extendable boom system, and a front-end pallet handling device.

Figure 1:
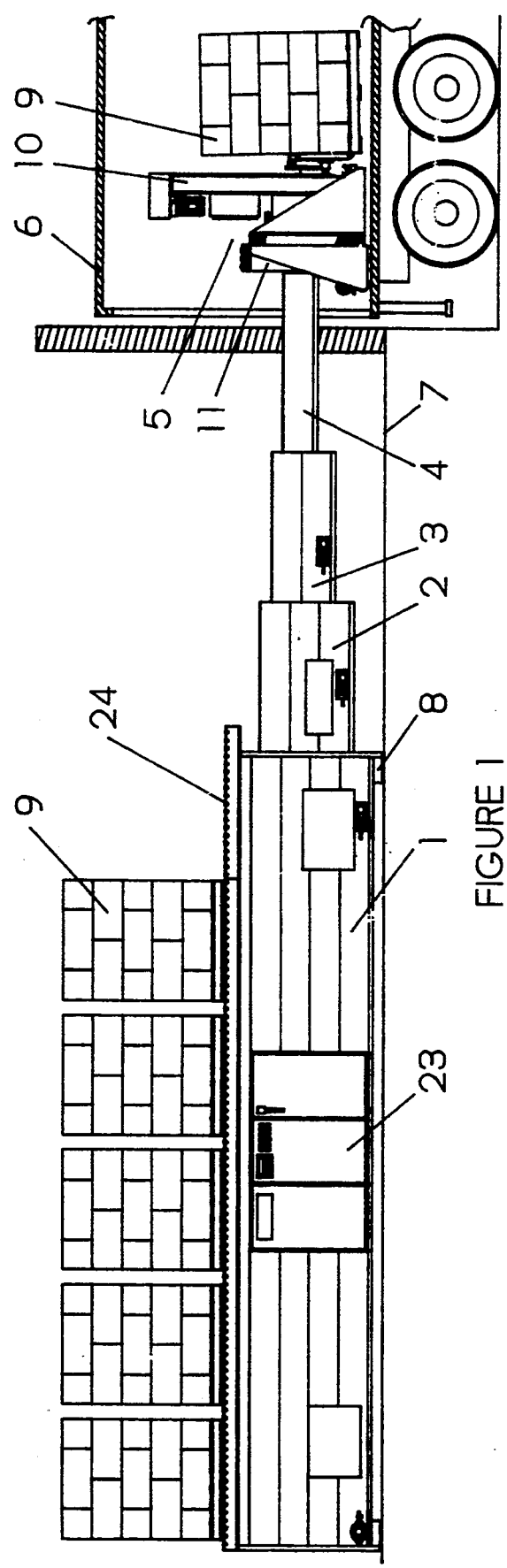
FIG. 1. Overall View of the Pallet Handling Conveyor System Apparatus.

Referring to FIG. 1, the base unit of the PHCS [1] comprising either a belt system or a roller conveyor system [24] generally rests on either a mobile undercarriage or directly on a loading dock (as shown) or other solid surface on vertical supports [8]. The adjustable booms attached to the front-end pallet handling device [2,3,4] extend into the cargo vehicle [6] to be loaded or unloaded. The front-end cargo handling system [5] is movably connected to the end of the foremost extendable boom [4] where it is used to remove or load pallets [9]. The front-end cargo handling system is in turn attached to the foremost boom via rigid members [11].

Figure 2:
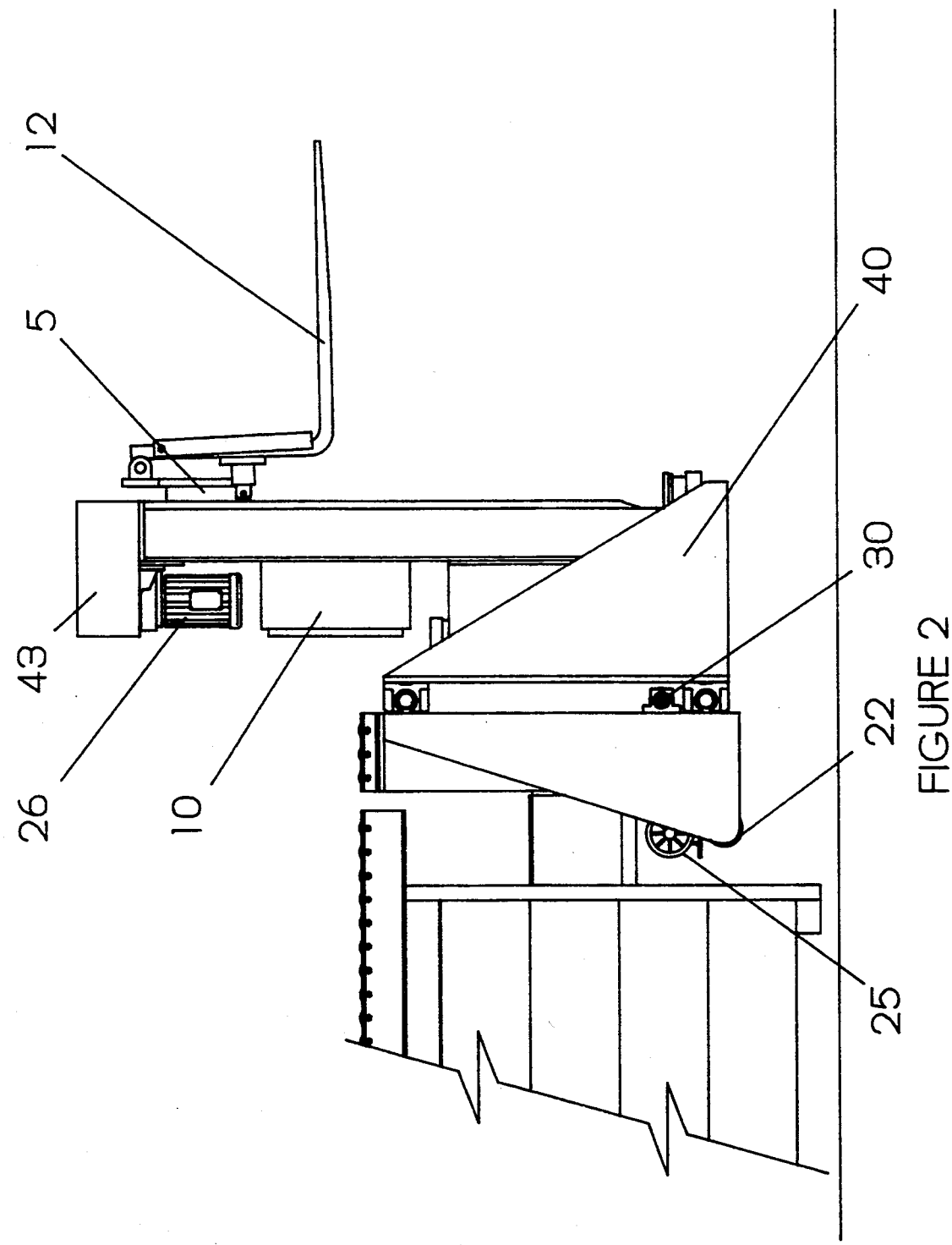
FIG. 2. Pallet handling front end (side view).

Referring to FIG. 2, the PHD is described. A vertical structure or mast [10] allows the forks [12] of the cargo handling unit [5] to be raised or lowered to lift a given pallet. A floor contact rollers assembly [22] is provided to counteract any torsional loads imposed by the pallet load being off-center. It should be noted that these floor contact rollers are not substantially load bearing for the cantilevered loads during normal, minimal torsion operation. During normal operation, the cargo load is completely supported by the adjustable booms and base unit. A lift drive [21] controls vertical movement of the forks. The horizontal ball screw [30] allows transverse movement of the PHD powered by a gear motor [25]. Distance measuring sensors [40, 43] are used to determine the internal dimensions of the cargo vehicle for automatic operation of the PHD.

Figure 3:
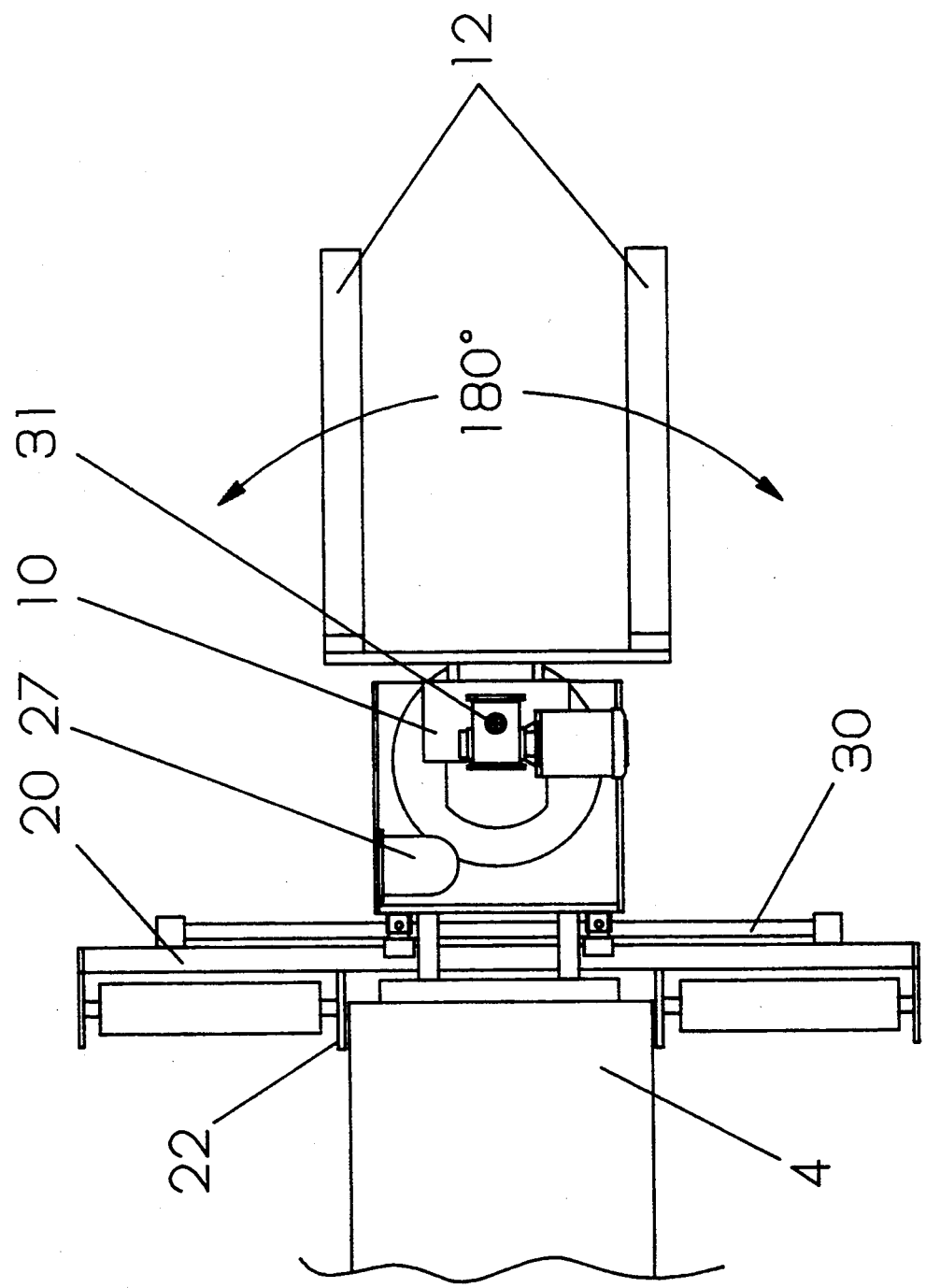
FIG. 3. Pallet handling front end (top view).

Referring to FIG. 3, the top view of the PHD is described. The forks [12] are attached to a carriage moveable within the vertical mast [10] by vertical ball screw [31]. The entire vertical assembly traverses laterally along horizontal support members [20] due to horizontal ball screw [30]. The PHD rotates in a horizontal plane under the control of a rotate device [27].

Figure 4:
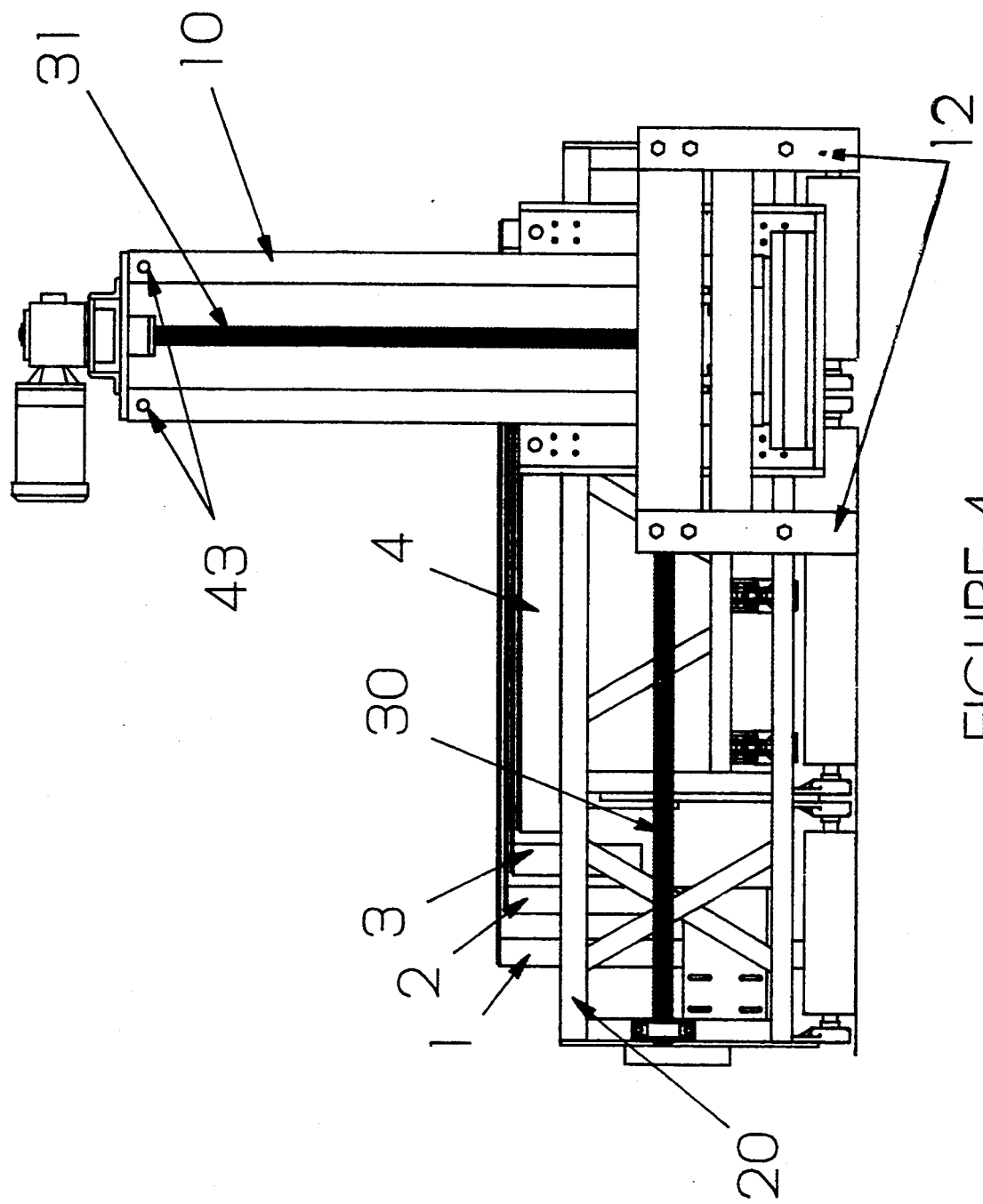
FIG. 4. Pallet handling front end (head on).

Referring to FIG. 4, the frontal view of the PHD is shown. The combination vertical ball screw mechanism and forklift is moved laterally across the horizontal support members [20[ by a horizontal ball screw mechanism [30]. In this fashion, the entire front-end apparatus can transverse laterally across the width of a trailer to be loaded or unloaded.

Figure 12:
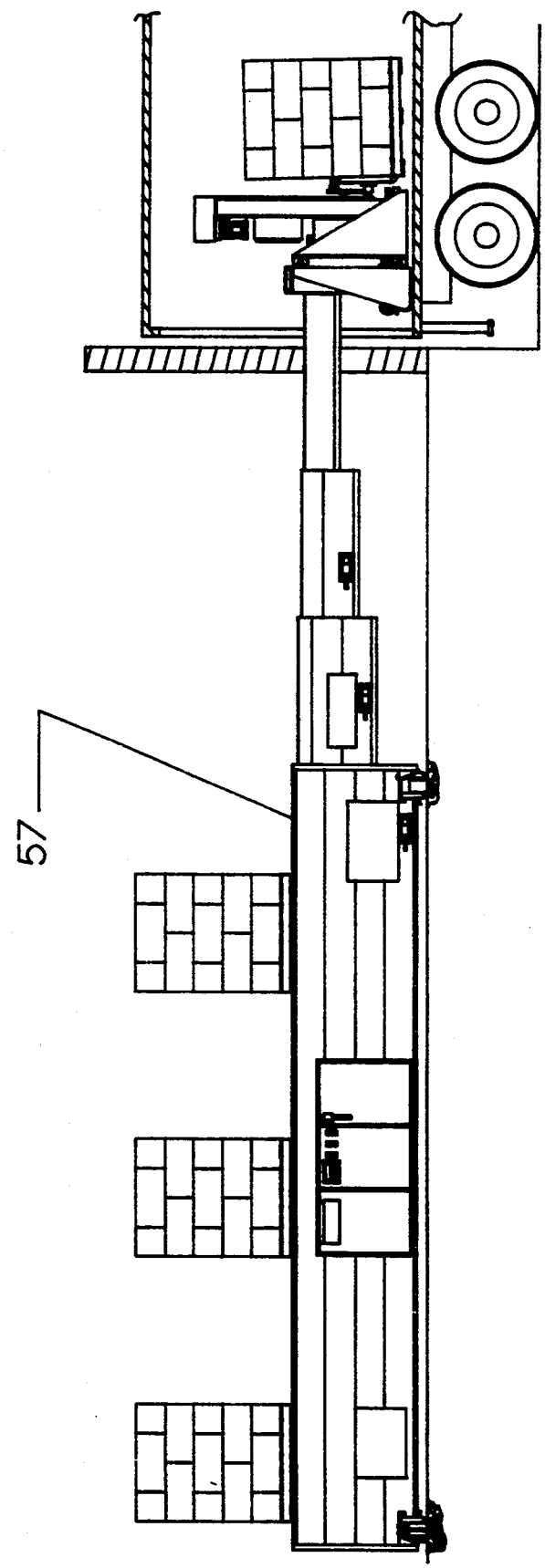
FIG. 12. Overall view of the Pallet Handling Conveyor System Apparatus using a belt conveyor system.

FIG. 12 shows the same view of the PHD as FIG. 1. FIG. 12 shows, however, the use of a belt conveyor system [50] rather than the roller conveyor system [24] shown in FIG. 1.

Referring again to FIG. 1, in the unload mode when a pallet is lifted by the front-end cargo handling unit [5], it is lifted off the floor. The extendable booms [4,3,2] retract and withdraw the front-end pallet handling device to the end of the vehicle. Upon reaching the end of the vehicle and the edge of the loading dock, the pallet is raised to a proper height, rotated and placed on the conveyor rollers. Once the pallet reaches the opposite end of the conveyor, it can be removed by any number of means available at the loading dock [7] level.

The invention data flow is now described. Vehicle dimensions and type of cargo are first determined and loaded into storage means, such as memory, within the central processing unit or the computer that controls the invention (See FIG. 1, No. 23). There are several manners in which the vehicle dimensions may be first determined. The vehicle which is being loaded or unloaded may be of standard dimensions, in which case default dimensions resident in the computer will be used. If the vehicle is not of standard dimensions, measurements may be taken of the vehicle interior by the operator of the system and then manually entered into the computer. If operator intervention is to be totally avoided, the dimensions may be determined automatically by the PHD itself. To do this, the start button is depressed and the unloaded PHD automatically extends into the empty vehicle cargo area. While the PHD extends into the trailer, the aforementioned sonic sensors measure the distance of the PHD from the sides of the trailer and from the trailer wall in front of the PHD. The PHD moves slowly through the trailer while gathering this information, periodically measuring the dimensions. Because measurements are taken throughout the vehicle, irregular cargo compartment shapes or aberrations due to skewed parking of the trailer are taken into account. In this manner, the PHD functions without any operator interaction. The sensor information is stored in the computer or central processing unit. Based upon these instructions and the resident logic in the CPU, instructions to the invention are generated. These instructions are subsequently transmitted to the PHD which results in loading or unloading actions.

During the course of loading or unloading, sensors on the PHD generate signals when the device comes in contact with the cargo being loaded or unloaded. Those signals are sent back to the central processing unit (CPU) for generating new instructions which again result in loading or unloading actions and adjustments. In this manner data are constantly being fed to the PHD and received from the PHD in order to effect the loading or unloading desired.

Figure 5:
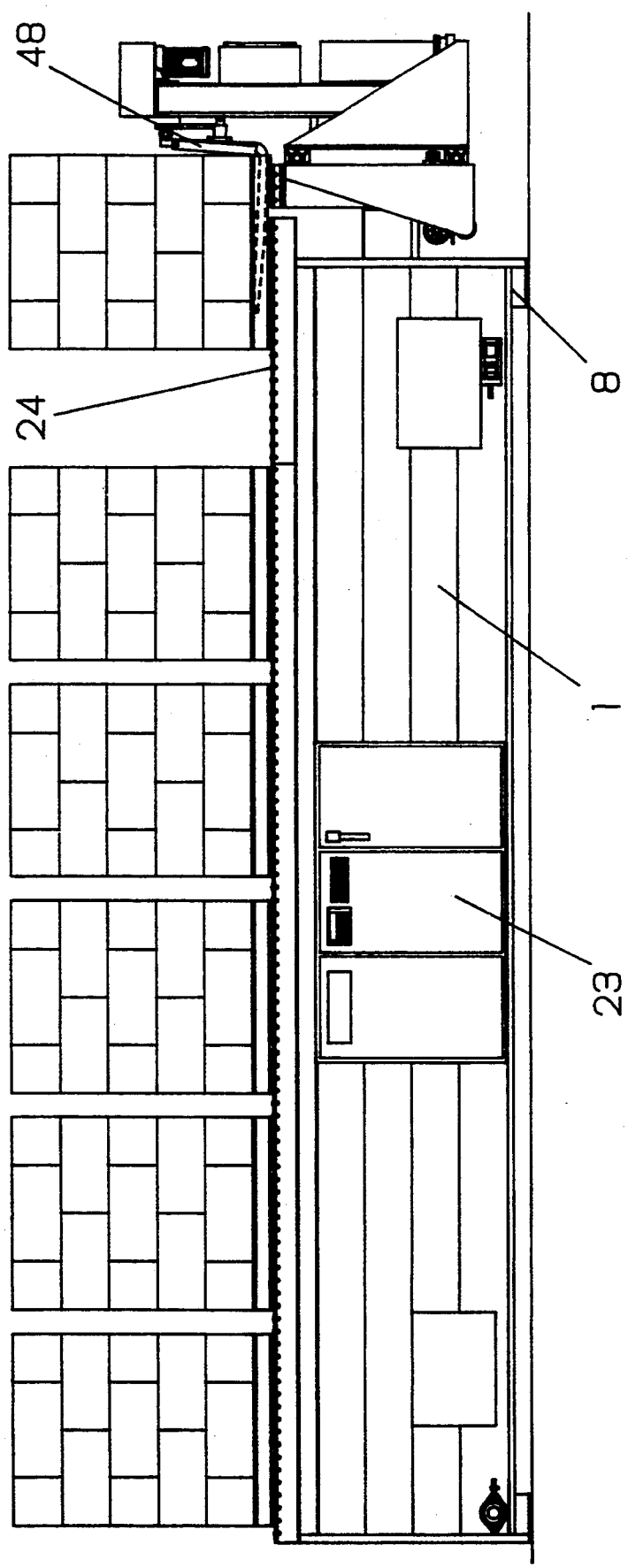
FIG. 5. Pallet Handling Conveyor System Apparatus picking up cargo.

Referring to FIG. 5, an example of a means for cargo contact signalling is shown. A bump bar [48] is moved when cargo is fully loaded onto the PHD forks. A signal is then sent to the CPU indicating that a cargo pallet is fully engaged on the forks.

The actual sensors used to determine the position of the PHD within the trailer may be chosen from among the sonic sensors available and known to those skilled in the art. The sensors used to measure the distance of the PHD from the sides of the trailer may be physically located anywhere on the PHD that offers an unobstructed path from the PHD to the sides of the trailer at an angle that is perpendicular to the PHD. For example, the sensors may be located on the left and right sides of the PHD carriage [40]. The sensors used to measure the distance of the PHD from loaded cargo in front of the PHD may be placed in any location offering an unobstructed forward path. Thus, these sensors may be placed near the top of the fork mast [43]. When wide loads are being handled, the fork mast may be fitted with an outrigger beam to support sensors beyond the sides of the load. Photo-reflective sensors may be placed in the same locations to guard against entry by persons while the system is activated. The system will therefore shut down if any movement is detected in front of or on either side of the PHD.

Contact sensors are used to prevent action beyond the normal design limits and to indicate a full return to the home, or fully retracted position. These contact sensors may be chosen from among the many circuit devices known by those skilled in the art to be suitable for such use. For example, limit switches may be designed into the PHD carriage, mast carriage, and fork mast to indicate to the PLC an end of travel or home condition.

An acceleration/deceleration control is also designed into the system of the present invention. The acceleration/deceleration control automatically controls the movement of the PHD such that it gradually speeds up from stopped positions and gradually slows down to a stop as it nears its destination. This ramping of PHD speed prevents jerky movements in carrying the cargo.

The PLC has various other input signals and output signals that drive the PHD. These signals are provided by similar sensors designed into the circuitry of the system. It is the reading and analysis of these signals by the PLC, and the subsequent actions performed by the PHD, that allow the system to operate with the precision necessary to overcome the problems inherent in previous devices. Those signals, categorized by functions are listed below (Note N.C.=normally closed, N.O=normally open, assertion level=voltage read from sensors):

| PLC CONTROLLER INPUTS | | |
| --- | --- | --- |
| OPERATOR CONTROL/INTERFACE -- FIXED SECTION | | |
|  | (CONTACT) (SENSE) | (ASSERTION) (LEVEL) |
| A.) System Control | | |
| 1.) Emergency Stop | N.C. | L |
| 2.) Alarm Acknowledge | N.O. | H |
| 3.) Start Auto-Seq. | N.O. | H |
| 4.) Hold Auto-Seq. | N.O. | H |
| 5.) Resume Auto-Seq. | N.O. | H |
| 6.) Auto/off/Manual | 2 × N.O. | H |
| 7.) Bypass-PLC/off/Total | 2 × N.O. | H |
| 8.) Operator interface keypad ... (see note at end of PLC INPUT list) |  | H |
| B.) Traverse Control (Manual mode) | | |
| 1.) Travel Forward | N.O. | H |
| 2.) Travel Backward | N.O. | H |
| 3.) Override | N.O. | H |
| 4.) Platform | N.O. | H |
| II. OPERATOR CONTROL/INTERFACE -- PHD | | |
| A.) General Control (manual mode) | | |
| 1.) Emergency Stop | N.C. | L |
| 2.) Fast/Slow Speed | 2 × N.O. | H |
| 3.) Initialize Boom Posit. | N.O. | H |
| B.) Boom Control (manual mode) | | |
| 1.) Operator's Platform | N.O. | H |
| 2.) Forks Extend | N.O. | H |
| 3.) Forks Retract | N.O. | H |
| C.) Fork Control -- Side/Lift/Rotate (manual mode) | | |
| 1.) Forks Left | N.O. | H |
| 2.) Forks Right | N.O. | H |
| 3.) Forks Up | N.O. | H |
| 4.) Forks Down | N.O. | H |
| 5.) Forks Rotate Front | N.O. | H |
| 6.) Forks Rotate Back | N.O. | H |
| D.) PHD Lift Control (manual mode) | | |
| 1.) PHD Raise | N.O. | H |
| 2.) PHD Lower | N.O. | H |
| III. SENSOR/OPERATION FEEDBACK (AUTO/MANUAL) | | |
|  | (CONTACT) (SENSE) | (ASSERTION) (LEVEL) |
| A.) Travel | | |
| 1.) Forward End of Travel | N.C. | L |
| 2.) Reverse End of Travel | N.C. | L |
| 3.) Front Bay Position | N.O. | H |
| 4.) Rear Bay Position | N.O. | H |
| 5.) Travel Position Counter | N.O. | H |
| 6.) Contractor-On/Brake-Off | N.O. | H |

-continued

|  |  | (CONTACT) (SENSE) | (ASSERTION) (LEVEL) |
|---|---|---|---|
| | 7.) Forward Collision Sensed | N.O. | L |
| | 8.) Rearward Collision Sensed | N.O. | L |
| B.) PHD Lift | | | |
| | 1.) Lower Limit | N.C. | L |
| | 2.) Raise Limit | N.C. | L |
| | 3.) Home Position | N.O. | H |
| | 4.) PHD Off Floor | N.O. | L |
| | 5.) PHD Boom Lift | N.O. | L |
| | 6.) Contractor-On/Brake-Off | N.O. | H |
| C.) Boom Control | | | |
| | 1.) Extend Limit | N.C. | L |
| | 2.) Retract Limit | N.C. | L |
| | 3.) Retract Decel | N.C. | L |
| | 4.) Contractor-On/Brake-Off | N.O. | H |
| | 5.) Position Encoder | Code | |
| | 6.) Home Position | N.O. | H |
| D.) Side Travel Control (PHD) | | | |
| | 1.) Left Limit | N.C. | L |
| | 2.) Right Limit | N.C. | L |
| | 3.) Home Position | N.O. | H |
| | 4.) Contact-On/Brake-off | N.O. | H |
| | 5.) Position Encoder | Code | |
| | 6.) Side-Looking Sensor | Analog | |
| E.) Fork Lift Control (PHD) | | | |
| | 1.) Lower Limit | N.C. | L |
| | 2.) Raise Limit | N.C. | L |
| | 3.) Contractor-On/Brake-off | N.O. | H |
| | 4.) Position Encoder | Code | |
| | 5.) Home Position | N.O. | H |
| F.) Rotate Control (PHD) | | | |
| | 1.) Front Position Limit | N.C. | L |
| | 2.) Back Position Limit | N.C. | L |
| | 3.) Rotate Position Encoder | Code | H |
| | 4.) Contractor-On/Brake Off | N.O. | H |
| | 5.) Home Position | N.O. | H |
| | | (CONTACT) (SENSE) | (ASSERTION) (LEVEL) |
| G.) Load Control (PHD) | | | |
| | 1.) Load on Left Fork | N.O. | H |
| | 2.) Load on Right Fork | N.O. | H |
| | 3.) Pallet Engaged Stage 1 | N.O. | H |
| | 4.) Pallet Engaged Stage 2 | N.C. | L |
| | 5.) Pallet Depth Stage 1 | N.O. | L |
| | 6.) Pallet Depth Stage 2 | N.O. | L |
| | 7.) Pallet Depth Stage 3 | N.O. | L |
| H.) Anti-Collision (PHD) | | | |
| | 1.) Front Left Sensor(s) | N.C. | L |
| | 2.) Front Right Sensor(s) | N.C. | L |
| | 3.) Retract Collision | N.O. | L |
| | 4.) Restricted Zone Violation | N.O. | L |
| I.) AF-1500 Motor Driver (Fixed Section) | | | |
| | 1.) Fault, Drive #1 | N.C. | L |
| | 2.) Fault, Drive #2 | N.C. | L |
| | 3.) Fault, Drive #3 | N.C. | L |
| J.) Additional Features for Unloading Option | | | |
| | 1.) Forward-Looking Senor | Analog | |
| | 2.) Left Pallet Rib Sensor | N.O. | H |
| | 3.) Right Pallet Rib Sensor | N.O. | H |

Operator Functions via Keypad Interface:

1.) Alarm
2.) Home Position
3.) Park Position
4.) Reset Auto-Seq.
5.) Load Mode
6.) Unload Mode
7.) Place/Pick Pallet Left (forced)
8.) Place/Pick Pallet Right (forced)
9.) Step Auto-Sequence Forward (in HOLD mode)
10.) Trailer Height
11.) Trailer Width
12.) Trailer Length
13.) Pallet Height
14.) Pallet Width
15.) Pallet Depth
16.) Pallet Spacing (average distance between pallets)
17.)

PLC CONTROLLER OUTPUTS

I. GENERAL CONTROL INTERFACE

A.) Station Control

-continued

1.) Machine running auto-sequence light
2.) Operation alarm light
3.) Operation shutdown light
4.) Alarm horn
5.) Multi-line output to keyboard display unit
6.) Multi-line output to line display unit
7.) Ready to receive pallet B.) Process Interface (N.O. outputs for customer use)
1.) Automatic unloading in progress
2.) Automatic loading in progress
3.) Operating Alarm
4.) Operating Shutdown
5.) Ready to receive pallet
6.) Normal Sequence Stop

II. MOTOR CONTROL INTERFACE

A.) Motor Starter Control
1.) Traverse right
2.) Traverse left
3.) PHD lift up
4.) PHD lift down
5.) Extend forks/booms
6.) Retract forks/booms
7.) Lift forks up
8.) Lift forks down
9.) Rotate forks to front
10.) Rotate forks to back
11.) Drive forks left
12.) Drive forks right
   1.) Frequency Drive #1 (Boom Traverse Motions)
      a.) Run (REV)
      b.) Run (FWD)
      c.) RESET
      d.) Accel/Decel 2
      e.) Select Speed 2
      f.) Select Speed 1

B.) Motor Speed Control
   2.) Frequency Drive #2 (PHD lift & left/right motions)
      a.) Run (REV.)
      b.) Run (FWD)
      c.) Reset
      d.) Accel/Decel 2
      e.) Select Speed 2
      f.) Select Speed 1
   3.) Frequency Drive #3 (rotate, & fork lift)
      a.) Run (REV.)
      b.) Run (FWD)
      c.) Reset
      d.) Accel/Decel 2
      e.) Select Speed 2
      f.) Select Speed 1

D. Motor Brake Control
1.) Traverse brake off
2.) Extend/retract brake off
3.) PHD Lift brake off
4.) Rotation brake off
5.) Left/right brake off
6.) Fork lift brake off

MISCELLANEOUS NOTES:

The location of the end of the dock will be hard programmed based on individual installations.
Standard trailer dimensions will be hard programmed into memory with an operator option to change these dimensions for a given load-cycle.
Line display unit and key pad for operator interface and alarm/query annunciation to be standard.
When a request to run auto-sequence is made, the program shall query the operator and require a positive response to machine status before permission to run is given.
1.) Bay Door Completely Open ?
2.) Trailer Properly Positioned With Doors Open ?
3.) Trailer Floor Clear of Obstacles ?
4.) Trailer Dimensions xxW × yyH × zzL ?
5.) Pallet Dimensions xxW × yyH × zzD ?
6.) Personnel Clear From Machine Operating Area ?
(more may be added)

While the PHD is operating in auto-load/unload mode, the program shall bypass control logic which is not needed. For example, the control logic utilized for traversing is not needed except when moving from one bay to another, the interface logic between the controller and the display units (line and keypad) need not be active until an interrupt occurs.

Figure 6:
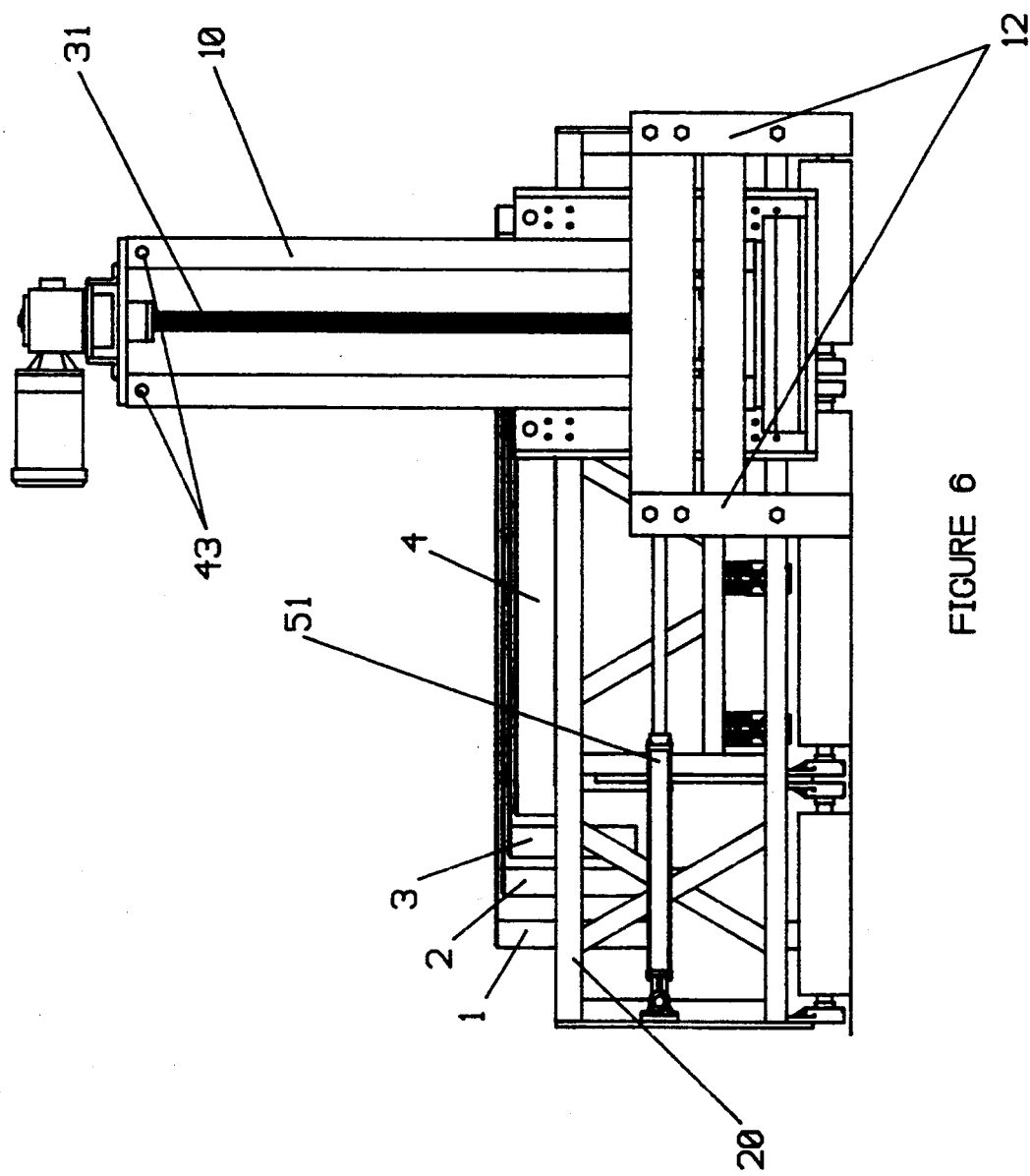
FIG. 6. Hydraulic means for moving the Pallet Handling Device Laterally.
Figure 7:
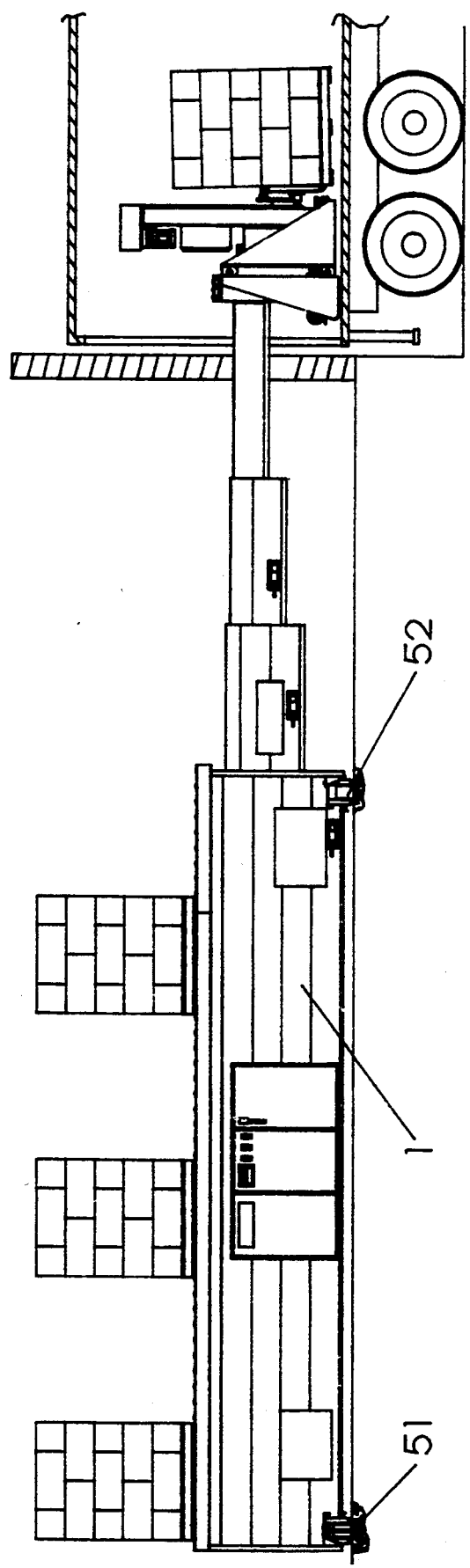
FIG. 7. Wheels on the undercarriage for moving the entire Pallet Handling Conveyor System Apparatus between loading docks.

FIG. 6 shows a front view of the Pallet Handling Conveyor System Apparatus. As shown, the apparatus includes a hydraulically actuated transverse movement means [51] for moving the front-end load handling device in a transverse direction. Such transverse movement facilitates loading and unloading the cargo vehicle. FIG. 7 shows a side view of the Pallet Handling Conveyor System Apparatus. As shown, the apparatus may include wheels [52] on the base unit [1] for moving the entire Pallet Handling Conveyor System Apparatus in a lateral direction between loading dock positions.

Figure 8:
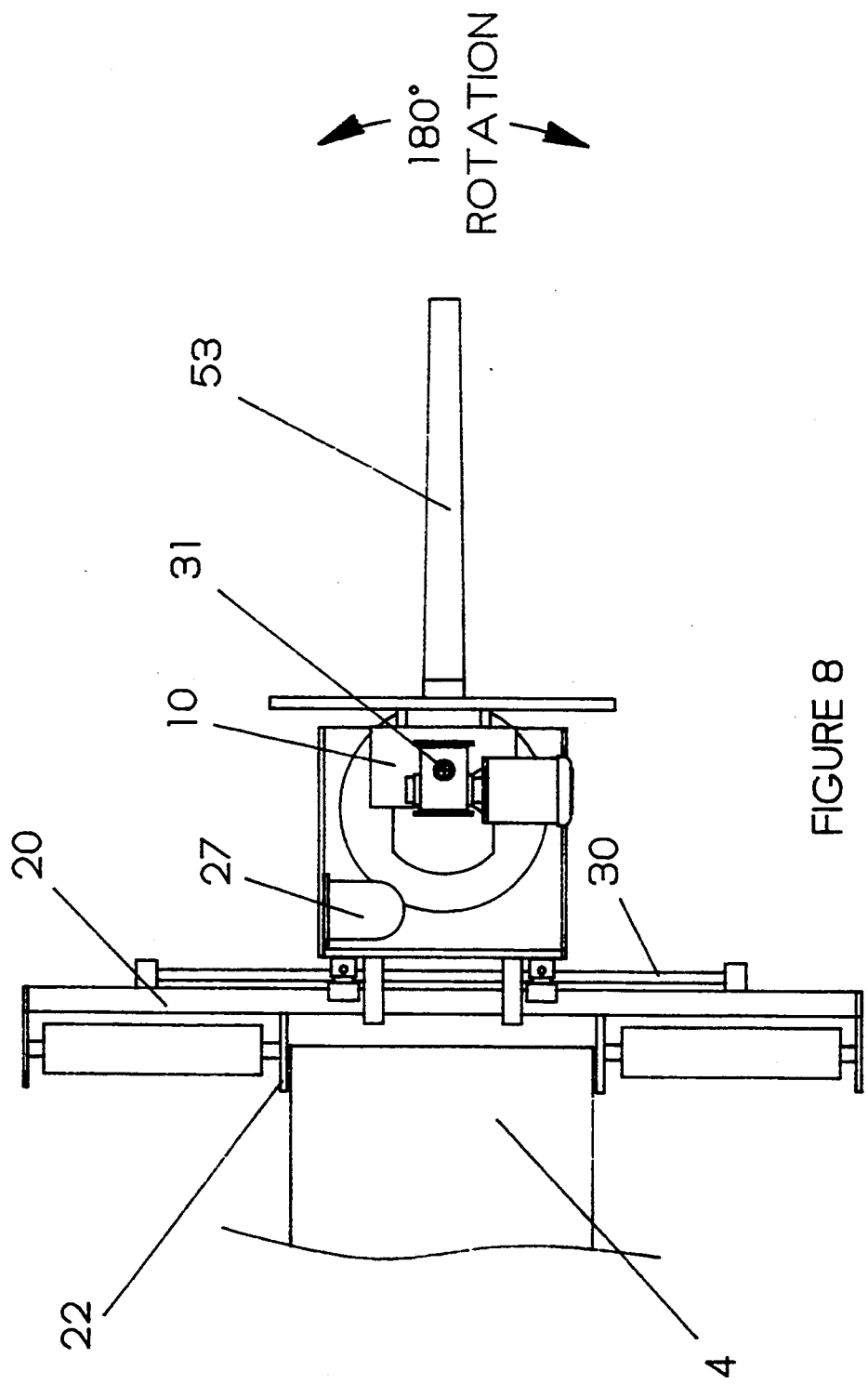
FIG. 8. Cylindrical load handling means.
Figure 9:
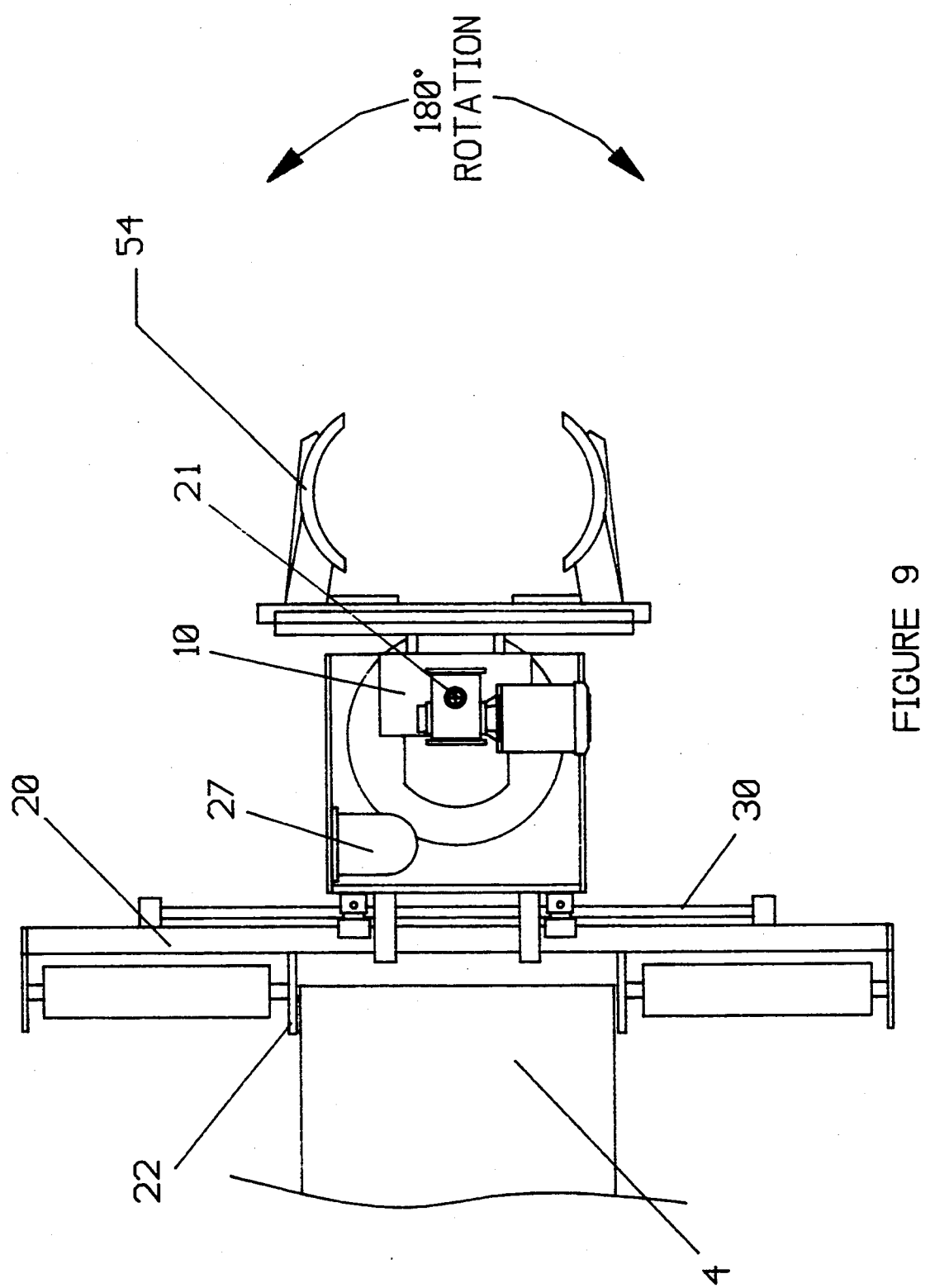
FIG. 9. Barrel gripping means.
Figure 10:
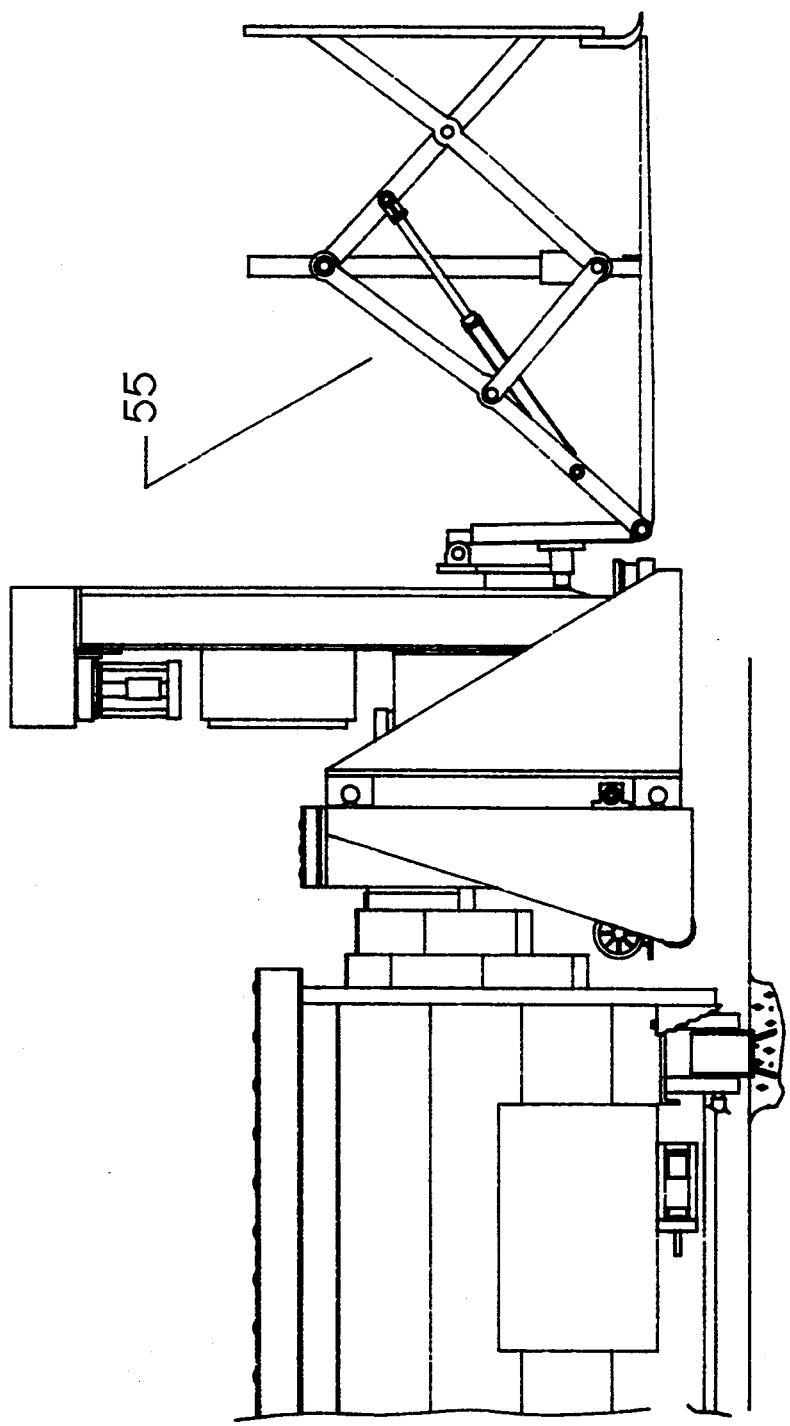
FIG. 10. Slip sheet gripping and pushing means.
Figure 11:
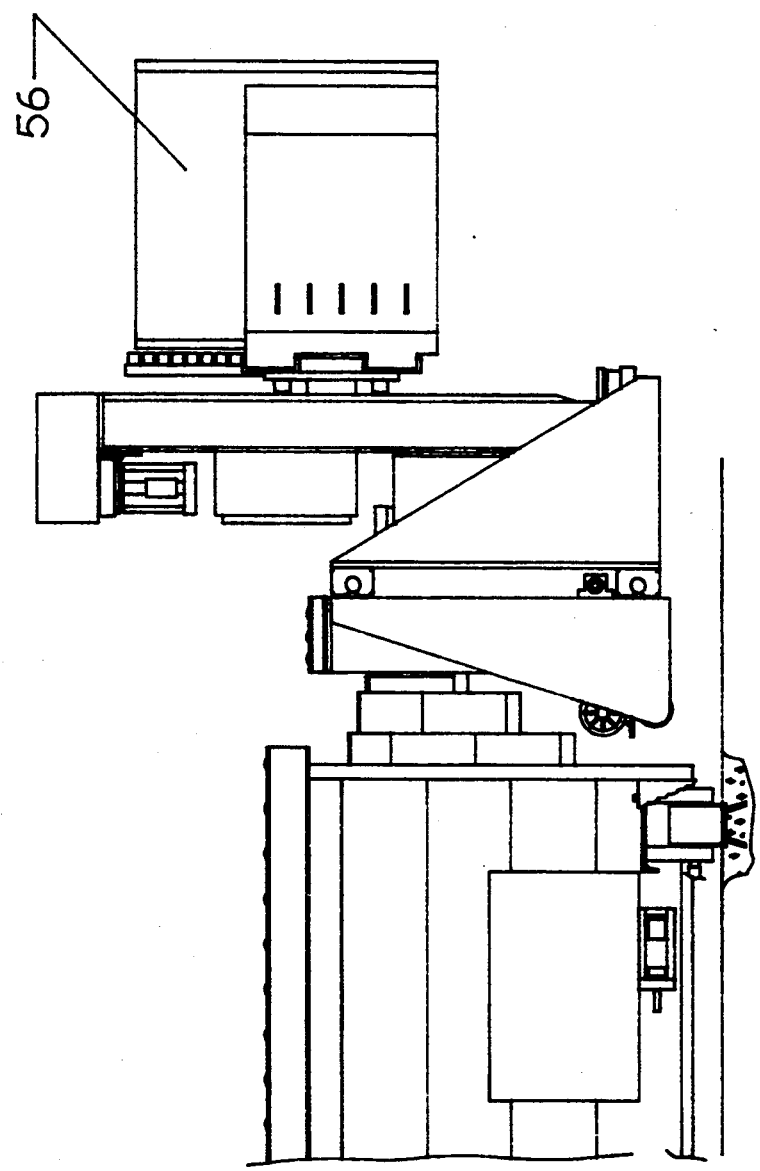
FIG. 11. Vertical side gripping means.

FIG. 8 shows a top view of the Pallet Handling Conveyor System Apparatus. As shown, the forks [12] may be replaced by a cylindrical load handling implement so that large cylindrical loads such as rolls of paper may be transported. Likewise, FIG. 9 shows barrel grippers [54] used in place of the forks, FIG. 10 shows a slip sheet gripping and pushing device [55] used in place of the forks, and FIG. 11 shows vertical side grippers [56] used in place of the forks.

While there have been shown and described preferred embodiments according to the invention, it is to be understood that there are other modifications and adaptations that may be made within the spirit and scope of the invention.

I claim:

1. A pallet handling adjustable conveyor for transferring palletized and non-palletized loads between a cargo vehicle and a cargo handling facility, comprising:

A) a longitudinally adjustable boom system located in a cargo handling facility for extending into a cargo vehicle to be loaded or unloaded;
B) front-end load handling means, attached to the adjustable boom system, for lifting and placing palletized and non-palletized loads in a vehicle; and
C) conveyor system means for bringing palletized and non-palletized loads to be loaded to the front-end load handling means for subsequent placement in the cargo vehicle;
D) the front-end load handling means comprising:
 1) a mast;
 2) vertically movable means movably connected to the mast for moving said load handling means vertically;
 3) horizontal support members attached to the front-end load handling means;
 4) transverse movement means movably attached to the horizontal support members for transporting said front-end load handling means in a transverse direction in the cargo vehicle; and
 5) a rotating bearing means for supporting and permitting the vertically movable means to rotate three hundred sixty degrees in a horizontal plane;
E) the cargo vehicle having a floor and the front-end load handling means further comprising substantially non-load bearing rollers which come in contact with the floor of the cargo vehicle to be loaded or unloaded to provide torsional stability for the pallet handling adjustable conveyor only as loads are moved transversely along the horizontal support members and only when torsional forces are strong enough to twist the pallet handling adjustable conveyor from a horizontal position;
F) wherein the movement of the longitudinally adjustable boom system and the movement of the front-end load handling means are controlled via logic means adapted to accept cargo vehicle dimensions for the purpose of determining the front-end load handling means position within the cargo vehicle to be loaded or unloaded, the pallet handling adjustable conveyor further comprising means for automatically measuring the cargo vehicle dimensions, storage means for storing cargo vehicle dimension information, the logic means adapted to automatically control the front-end load handling means in loading and unloading the cargo vehicle based on the cargo vehicle dimension information; and
G) the front-end load handling means transverse movement means being selected from the group consisting of electrically actuated movement means and hydraulically actuated movement means.

2. A pallet handling adjustable conveyor for transferring palletized and non-palletized loads between a cargo vehicle and a cargo handling facility, comprising:

A) a longitudinally adjustable boom system located in a cargo handling facility for extending into a cargo vehicle to be loaded or unloaded;
B) front-end load handling means, attached to the adjustable boom system, for lifting and placing palletized and non-palletized loads in a vehicle; and
C) conveyor system means for bringing palletized and non-palletized loads to be loaded to the front-end load handling means for subsequent placement in the cargo vehicle;
D) the front-end load handling means comprising:
 1) a mast;
 2) vertically movable means movably connected to the mast for moving said load handling means vertically;
 3) horizontal support members attached to the front-end load handling means;
 4) transverse movement means movably attached to the horizontal support members for transporting said front-end load handling means in a transverse direction in the cargo vehicle; and
 5) a rotating bearing means for supporting and permitting the vertically movable means to rotate three hundred sixty degrees in a horizontal plane;
E) the cargo vehicle having a floor and the front-end load handling means further comprising substantially non-load bearing rollers which come in contact with the floor of the cargo vehicle to be loaded or unloaded to provide torsional stability for the pallet handling adjustable conveyor only as loads are moved transversely along the horizontal support members and only when torsional forces are strong enough to twist the pallet handling adjustable conveyor from a horizontal position;
F) wherein the movement of the longitudinally adjustable boom system and the movement of the front-end load handling means are controlled via logic means adapted to accept cargo vehicle dimensions for the purpose of determining the front-end load handling means position within the cargo vehicle to be loaded or unloaded, the pallet handling adjustable conveyor further comprising means for automatically measuring the cargo vehicle dimensions, storage means for storing cargo vehicle dimension information, the logic means adapted to automatically control the front-end load handling means in loading and unloading the cargo vehicle based on the cargo vehicle dimension information; and G) the longitudinally adjustable boom system comprising wheels to move the pallet handling adjustable conveyor laterally from a first loading dock position to a second loading dock position.

3. A pallet handling adjustable conveyor for transferring palletized and non-palletized loads between a cargo vehicle and a cargo handling facility, comprising:

A) a longitudinally adjustable boom system located in a cargo handling facility for extending into a cargo vehicle to be loaded or unloaded;

B) front-end load handling means, attached to the adjustable boom system, for lifting and placing palletized and non-palletized loads in a vehicle; and C) conveyor system means for bringing palletized and non-palletized loads to be loaded to the front-end load handling means for subsequent placement in the cargo vehicle;

D) the front-end load handling means comprising:
   1) a mast;
   2) vertically movable means movably connected to the mast for moving said load handling means vertically;
   3) horizontal support members attached to the front-end load handling means;
   4) transverse movement means movably attached to the horizontal support members for transporting said front-end load handling means in a transverse direction in the cargo vehicle; and
   5) a rotating bearing means for supporting and permitting the vertically movable means to rotate three hundred sixty degrees in a horizontal plane;

E) the cargo vehicle having a floor and the front-end load handling means further comprising substantially non-load bearing rollers which come in contact with the floor of the cargo vehicle to be loaded or unloaded to provide torsional stability for the pallet handling adjustable conveyor only as loads are moved transversely along the horizontal support members and only when torsional forces are strong enough to twist the pallet handling adjustable conveyor from a horizontal position;

F) wherein the movement of the longitudinally adjustable boom system and the movement of the front-end load handling means are controlled via logic means adapted to accept cargo vehicle dimensions for the purpose of determining the front-end load handling means position within the cargo vehicle to be loaded or unloaded, the pallet handling adjustable conveyor further comprising means for automatically measuring the cargo vehicle dimensions, storage means for storing cargo vehicle dimension information, the logic means adapted to automatically control the front-end load handling means in loading and unloading the cargo vehicle based on the cargo vehicle dimension information; and G) the front-end load handling means being selected from the group consisting of forklift handling means for handling palletized loads, cylindrical load handling means for handling non-palletized cylindrical loads, barrel gripping means, slip sheet gripping and pushing means, and vertical side gripping means.

4. A pallet handling adjustable conveyor for transferring palletized and non-palletized loads between a cargo vehicle and a cargo handling facility, comprising:

A) a longitudinally adjustable boom system located in a cargo handling facility for extending into a cargo vehicle to be loaded or unloaded;

B) front-end load handling means, attached to the adjustable boom system, for lifting and placing palletized and non-palletized loads in a vehicle; and C) conveyor system means for bringing palletized and non-palletized loads to be loaded to the front-end load handling means for subsequent placement in the cargo vehicle;

D) the front-end load handling means comprising:
   1) a mast;
   2) vertically movable means movably connected to the mast for moving said load handling means vertically;
   3) horizontal support members attached to the front-end load handling means;
   4) transverse movement means movably attached to the horizontal support members for transporting said front-end load handling means in a transverse direction in the cargo vehicle; and
   5) a rotating bearing means for supporting and permitting the vertically movable means to rotate three hundred sixty degrees in a horizontal plane;

E) the cargo vehicle having a floor and the front-end load handling means further comprising substantially non-load bearing rollers which come in contact with the floor of the cargo vehicle to be loaded or unloaded to provide torsional stability for the pallet handling adjustable conveyor only as loads are moved transversely along the horizontal support members and only when torsional forces are strong enough to twist the pallet handling adjustable conveyor from a horizontal position;

F) wherein the movement of the longitudinally adjustable boom system and the movement of the front-end load handling means are controlled via logic means adapted to accept cargo vehicle dimensions for the purpose of determining the front-end load handling means position within the cargo vehicle to be loaded or unloaded, the pallet handling adjustable conveyor further comprising means for automatically measuring the cargo vehicle dimensions, storage means for storing cargo vehicle dimension information, the logic means adapted to automatically control the front-end load handling means in loading and unloading the cargo vehicle based on the cargo vehicle dimension information; and G) the conveyor system means being selected from the group consisting of belt conveyors and roller conveyors.

* * * * *